United States Patent [19]
Van Brunt et al.

[11] Patent Number: 4,705,915
[45] Date of Patent: Nov. 10, 1987

[54] CABLE SHIELD TERMINATION MEANS

[76] Inventors: Michael K. Van Brunt, 9754 Big Horn, Ventura, Calif. 93004; Jeffrey J. Hager, 555 Rosewood, #205, Camarillo, Calif. 93010

[21] Appl. No.: 747,782

[22] Filed: Jun. 24, 1985

[51] Int. Cl.$^4$ .............................................. H05K 9/00
[52] U.S. Cl. ................................ 174/35 R; 174/65.55
[58] Field of Search ............... 174/35 R, 65 R, 65 SS, 174/78; 285/158

[56] References Cited

U.S. PATENT DOCUMENTS 3,647,934  3/1972  Hurtt .................................. 174/78 X
4,547,623  10/1985  Van Brunt et al. .............. 174/35 R Primary Examiner—Arthur T. Grimley
Assistant Examiner—D. A. Tone

[57] ABSTRACT

The outer insulation on a cable to be terminated is removed leaving a section of exposed cable shield. An annular metal contact with a deformable circumferential flange is received on the cable and affixed (soldered) to the bare shield completely encircling the shield with a mechanical and electrical connection. A receiving tube slid onto the cable has a contoured end for receipt under the contact flange. A clamping ring is soldered, mechanically or electromagnetically formed over the flange and contoured end of the receiving tube.

A cylindrical cap encloses the bare shield section and contact with thin-wall portions being deformed to tightly engage the receiving tube. The cable and outer end of the receiving tube are passed through an opening in a termination plate (e.g., ship deck) and the receiving tube is welded to the plate.

5 Claims, 3 Drawing Figures

CABLE SHIELD TERMINATION MEANS

FIELD OF THE INVENTION

The present invention relates generally to the termination of shielding of a shielded cable, and, more particularly, to apparatus to be mounted onto a shielded cable for terminating the shield to a grounding plane or wall through which the cable passes, such as the deck of a ship or floor of a vehicle, for example.

BACKGROUND

There are many situations in which practical difficulties arise because a shielded cable is exposed to relatively large electromagnetic interference fields which induce interference voltages in the shield that can be carried along the cable to a point where they could damage or substantially impair equipment interconnected with the cable. On board ship, for example, there are many situations where equipment located below deck is connected to other equipment located above the deck with interconnections being provided via shielded cables which would normally be exposed to substantial interference electromagnetic energy, such as generated by the ship's radar. It is, therefore, highly desirable to ground or terminate the cable shield to the deck or adjacent superstructure before the cable passes through the deck to internally located utilization equipment. This problem is especially severe in naval craft where electromagnetic fields produced by radar gives rise to an interference field of relatively high level.

In the event of a nuclear explosion, an electrical pulse (EMP) of such magnitude is generated as to destroy communications and wipe out data bases in computers, for example, over a geographical area substantially exceeding the blast area of damage. Such a problem not only would have severe consequences for the public generally, but also would be devastating on military electronics. Shielding of sensitive electronic circuits, components, and cables by enclosing them within a conductive member that would conduct such EMP energy to the ground can be effective, if properly handled. However, any gap that may exist in the conductive path to ground could result in destruction of the protective circuitry and, therefore, to be fully effective such grounding protection must exist not only on the cables themselves but also at any connector for the cables.

The most common approach to solving or reducing this problem in the past has been simply interconnecting a single element conductor (so-called "pig tail") between the cable shield and a grounding point such as the deck. A pig tail interconnection is, of course, only to a single limited point on the shield and would not be sufficient to removed induced signals of a relatively high level, at least to the extent necessary to avoid damaging interference to interconnected equipment. Moreover, typical one point connection by a pig tail leaves exposed parts of the shield which can result in deterioration of the shield and pig tail due to adverse environmental factors.

A further approach is that disclosed in copending U.S. patent application Ser. No. 642,170, Cable Shield Grounding Apparatus by M. K. Van Brunt et al. and assigned to the same assignee as the present application, in which a spring member has a plurality of contact fingers that are pressed against the cable shield by a containing cylindrical part. A cap is threaded onto the cylindrical part, and the latter is welded to the grounding plate (e.g. ship deck).

SUMMARY OF THE INVENTION

A portion of the outer insulation on a cable to be terminated is removed leaving a section of exposed cable shield. A split-ring annular metal contact with a deformable circumferential flange is received on the cable and affixed (soldered) to the bare shield completely encircling the shield with a mechanical and electrical connection. A split-ring receiving tube slid onto the cable has a contoured end for receipt under the contact flange. A solid or split ring is soldered, mechanically or electromagnetically formed over the flange and contoured end of the receiving tube.

A cylindrical cap encloses the bare shield section and contact with thin-wall portions being deformed to tightly engage the receiving tube. The cable and outer end of the receiving tube are passed through an opening in a termination plate (e.g., ship deck) and the receiving tube is welded to the plate.

DESCRIPTION OF A PREFERRED EMBODIMENT

Figures 1, 2, 3:
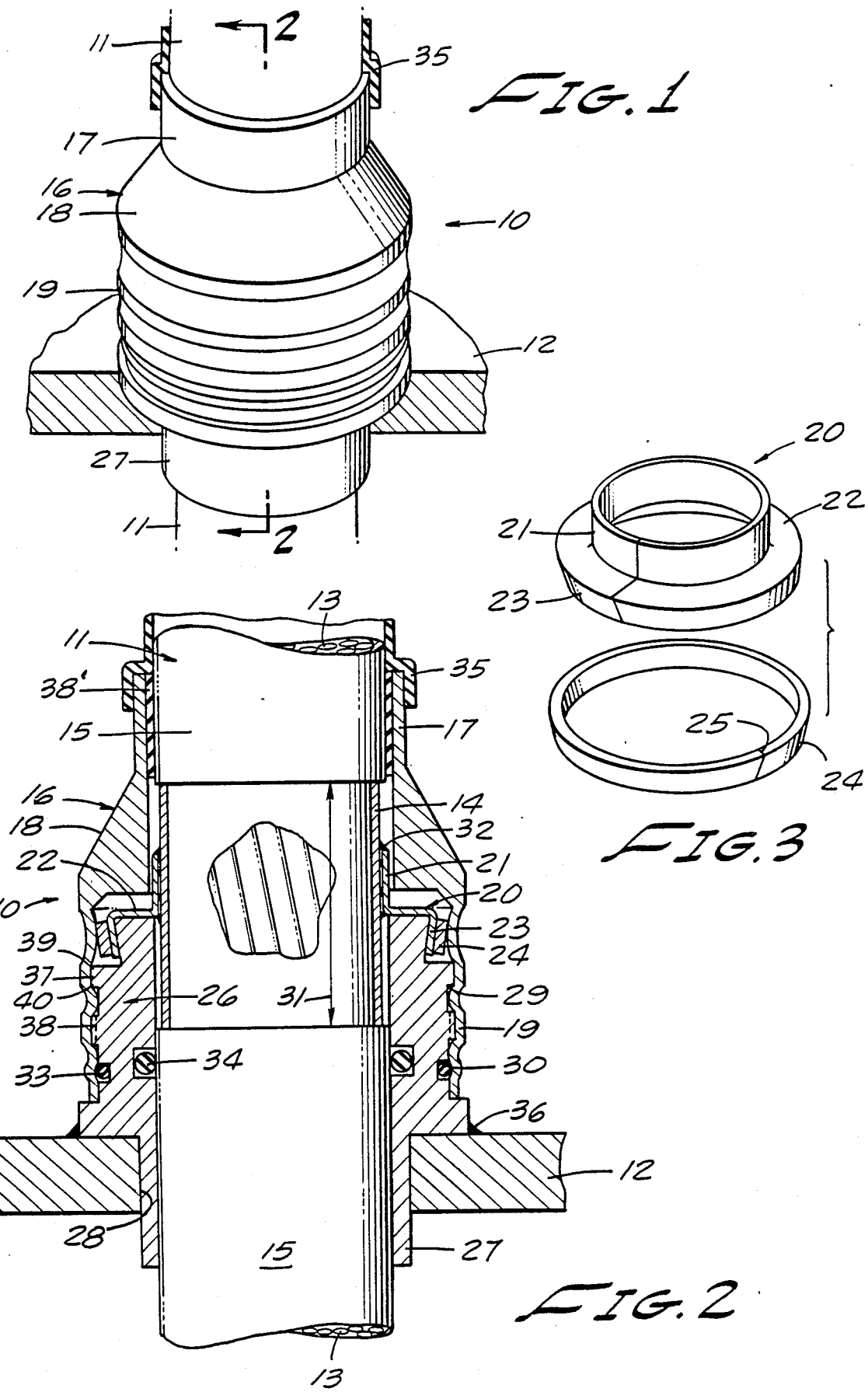
FIG. 1 is a perspective view of the cable shield terminating apparatus of this invention shown in place on a cable and establishing termination to a plate.
FIG. 2 is a side elevational sectional view taken along the line 2—2 in FIG. 1.
FIG. 3 is an exploded perspective view of certain termination apparatus parts.

As shown in FIG. 1 of the drawings, the cable shield terminating apparatus is identified generally as a 10 and depicted in place on a shielded jacketed cable 11. In a way to be described, the apparatus 10 effects termination or grounding of the cable shield to a metal wall, panel or deck 12.

Turning now to FIG. 2, the cable 11 typically includes one or more individual cable wires 13 each cable wire optionally having an individual shield. These one or more cable wires are, in turn, all enclosed within a common completely encompassing conductive shield 14 which may be of a braided wire construction, for example. The entire shielded cable may also be enclosed within an outer insulative and/or protective covering 15 made of a relatively flexible rubber or plastic, for example.

The termination apparatus includes, as a major element thereof, an end cap 16 having a regular cylindrical portion 17 with an internal bore of slightly larger diameter than that of the overall cable diameter. The cylindrical portion 17 is integral with a tapering central section 18 and at its opposite end a thin-wall cylinder 19, the latter having an inner diameter that is larger than the bore of 17. The thinwall cylinder 19, before assembly of the various parts of apparatus 10, is of smooth regular dimensions, the various indentations and grooves shown in FIG. 2 being provided during assembly as will be described.

A contact 20, which as will be shown effects the essential internal connection with the cable shield 14, consists of a generally split-ring construction having a first cylindrical portion 21 of diameter substantially equal to or slightly less than that of the outer diameter of the cable and conductive shield 14. Integral with the cylindrical portion 21 is a radially outwardly extending rim 22 that terminates in an outer cylindrical flange 23. A crimp ring 24 is a metal ring that is split as at 25 and has an inner wall of dimensions slightly larger than those of the flange 23. More particularly, the crimping ring 24 has an internal dimension such that it may be fittingly received onto the flange 23 of the contact, and firmly secured thereabout by mechanical or electromagnetic forming and/or soldering, as will be discussed.

Although the split ring construction for the contact 20 and crimp ring 24 would be especially advantageous for retrofitting, as an alternative the contact and crimp ring can be made solid in a new ship installation, for example.

A receiving tube 26 is a metallic, generally cylindrical tube having a reduced diameter portion 27 at one end for receipt through a similarly dimensioned opening 28 in the deck or grounding plane 12. The opposite end portion is turned down to provide a contoured outer surface, circular in cross-section and of such dimensions as to receive the contact flange 23 thereabout. The intermediate portion of the receiving tube has a plurality of circumferential recesses in its outer surface such as at 29 and 30 for mechanical and environmental reasons to be commented on later. Also located between the circumferential recesses are outwardly protruding circumferential flanges 37 and 38.

The flange 37 makes direct and continuous contact with the end cap along the flange edges 39 and 40 eliminating all leak paths for high frequency electromagnetic interference field intrusion, and at the same time establishing good electrical contact to reduce low frequency impedance between the end cap and receiving tube.

The other flange 38 has a set of teeth on its outer surface which substantially enhance mechanical strength of the end cap and receiving tube connection Optimum strength is achieved by having the teeth bite into the end cap but not to the extent that the end cap wall bottoms out in the teeth.

The teeth biting into the end cap provides a visible and tactile indication of the joint between the end cap and receiving tube. Ideally, the end cap would project over each tooth an equal amount.

Preferably the recess 29 between flanges 37 and 38 is of such width that the end cap material will not bottom out in the recess which increases bending moment strength.

Prior to assembly of the termination apparatus onto the cable, a portion of the insulative protective material 15 is removed from a section of the cable leaving a bare cable shield portion 31. Then, by virtue of the split-ring construction, the contact 20 is received onto the bare shield portion 31 with the flanges directed toward the receiving tube and the contact is both electrically and physically connected to the cable shield 14 by soldering as at 32. Preferably, soldering is accomplished in a closed 360 degree path completely about the cable shield.

The receiving tube 26 is then slid along the cable and the special contoured end abuts against the underside of rim 22 of the contact 20. The crimp ring 24 is located over the flange 23 on the contact and crimped, or optionally soldered in place, thereby electrically and mechanically securing the contact to the receiving tube. Next, the end cap 16 is received on the cable with the large diametral end passing over the receiving tube, the dimensions of the end cap being such as to completely enclose the bare cable shield portion 31 and the regular cylinder portion 17 extending onto the cable itself.

An environmental seal 38', such as a ring of plastic or soft rubber, is located between the end cap cylinder 17 and the cable 11. Finally, the thin wall cylindrical end 19 of the end cap is crimped onto the receiving tube 26 by a mechanical tool, or by electromagnetic forming, for example, such that the thin wall member is deformed into the recesses 29 and 30.

Preferably, one or more of the recesses in the receiving tube is sealed by an O-ring 33 to prevent the ingress of dirt, dust and moisture. Similarly, a further O-ring 34 mounted within a recess in the internal wall of the receiving tube seals the receiving tube to the cable against the ingress of dirt, dust, moisture or other foreign matter existing in the environment.

As a final matter of assembly, the cable 11 and the reduced diameter portion 27 of the receiving tube are passed through opening 28 and the receiving tube is electrically and mechanically secured to the wall, panel or deck 12 by the weldment 36 preferably completely encircling the receiving tube.

What is claimed is:

1. Apparatus for electrically terminating the shield of a shielded cable to the edge portions of an opening in a conductive panel, the cable passing through the panel opening, comprising:
   cylindrical means for encircling the cable shield and including a continuous circumferentially outwardly extending flange;
   a receiving tube having at least two circumferentially extending recesses, a bore of sufficient size to permit receipt onto the cable, and an end portion fitting under the cylindrical means flange;
   a clamping ring received over the flange;
   a cylindrical cap having end parts clamped about the ring and deformed into the receiving tube recesses forming a continuous contacting interconnection between the cap, ring and cylindrical means flange; and
   the other end of the receiving tube being dimensioned to enable fitting receipt through the panel opening.

2. Apparatus as in claim 1, in which an O-ring is located in one of said recesses and the cap end parts are deformed thereover.

3. Apparatus as in claim 2, in which the receiving tube end portion has its outer surface beveled from a maximum cross-section at its end such that the cylindrical means flange is anchored to said end portion when clamped thereon.

4. Apparatus as in claim 1, in which the cap has other end parts including sealing means.

5. Apparatus for electrically terminating the shield of a shielded cable to the edge portions of an opening in a conductive panel, the cable passing through the panel opening, comprising:
   cylindrical means for encircling the cable shield and including a continuous circumferentially outwardly extending flange;
   a receiving tube having at least two circumferential recesses, a bore of sufficient size to permit receipt onto the cable, and an end portion fitting under the cylindrical means flange, said receiving tube end portion has its outer surface beveled from a maximum cross-section at its end;
   a clamping ring received over the flange;
   a cylindrical cap having end parts clamped about the ring and deformed into the receiving tube recesses forming a continuous contacting interconnection between the cap, ring and cylindrical means flange; and
   the other end of the receiving tube being dimensioned to enable fitting receipt through the panel opening.

* * * * *